(12) United States Patent
Fox et al.

(10) Patent No.: US 9,902,499 B2
(45) Date of Patent: *Feb. 27, 2018

(54) HUMAN FACTORS APPROACH TO CONTROL CONTAMINANT CONCENTRATIONS IN AIRCRAFT SUPPLY AIR FROM ENGINE AND APU BLEED AIR AND GROUND AIR SOURCES, AND IN RECIRCULATED AIR BEING DELIVERED TO AIRCRAFT CABINS FOR THE OPTIMIZATION OF USER EXPERIENCE AND ENERGY CONSUMPTION

(71) Applicant: HONEYWELL INTERNATIONAL INC., Morris Plains, NJ (US)

(72) Inventors: Richard B. Fox, San Tan Valley, AZ (US); Deanna P. Chase, Tempe, AZ (US); Paul Kurlak, Scottsdale, AZ (US); Mike Koerner, Rancho Palos Verdes, CA (US); Bijan F. Hagh, Newport Beach, CA (US); Russell W. Johnson, Elmhurst, IL (US); Stephen Yates, South Barrington, IL (US); Peter M. Michalakos, Arlington Heights, IL (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/661,275

(22) Filed: Jul. 27, 2017

(65) Prior Publication Data

US 2017/0334565 A1    Nov. 23, 2017

Related U.S. Application Data

(63) Continuation of application No. 14/606,617, filed on Jan. 27, 2015.

(51) Int. Cl.
*B01D 53/02* (2006.01)
*B64D 13/06* (2006.01)
(Continued)

(52) U.S. Cl.
CPC ............. *B64D 13/06* (2013.01); *B01D 53/30* (2013.01); *F24F 3/16* (2013.01); *F24F 11/0017* (2013.01);
(Continued)

(58) Field of Classification Search
CPC  B01D 53/34; B64D 13/06; B64D 2013/0603; F24F 11/0017; F24F 3/16; Y02T 50/56
See application file for complete search history.

(56) References Cited

U.S. PATENT DOCUMENTS

| 5,725,425 A | 3/1998 | Rump |
| 5,750,999 A | 5/1998 | Fox |

(Continued)

FOREIGN PATENT DOCUMENTS

| DE | 102009017932 A1 | 11/2010 |
| WO | 2011145781 A1 | 11/2011 |

OTHER PUBLICATIONS

Fox, Assessing Aircraft Supply Air to Recommend Compounds for Timely Warning of Contamination, Dissertation submitted to Northcentral University, Apr. 2012.
(Continued)

*Primary Examiner* — Christopher P Jones
(74) *Attorney, Agent, or Firm* — Shimokaji IP

(57) ABSTRACT

An Environmental Control System includes a sensor, an air purification subsystem, and a controller in communication with the sensor and air purification subsystem. The sensor detects a contaminant in the air and generates a contaminant signal. The controller compares the contaminant signal to a predicted sensory response threshold. When the contaminant
(Continued)

signal reaches the predicted sensory response threshold, the controller commands the air purification subsystem to alter a condition in the air.

8 Claims, 21 Drawing Sheets

(51) Int. Cl.
  *B01D 53/30* (2006.01)
  *F24F 3/16* (2006.01)
  *F24F 11/00* (2018.01)

(52) U.S. Cl.
  CPC .. *B01D 2258/06* (2013.01); *B01D 2259/4575* (2013.01); *B64D 2013/0603* (2013.01); *F24F 2011/0002* (2013.01); *F24F 2011/002* (2013.01); *Y02B 30/78* (2013.01); *Y02T 50/56* (2013.01)

(56) References Cited

U.S. PATENT DOCUMENTS

| | | | |
|---|---|---|---|
| 5,791,982 | A | 8/1998 | Curry et al. |
| 6,711,470 | B1 | 3/2004 | Hartenstein |
| 7,089,747 | B2 | 8/2006 | Fox |
| 7,122,065 | B2 | 10/2006 | Fox |
| 7,143,631 | B2 | 12/2006 | Nurcombe |
| 7,803,039 | B2 | 9/2010 | Inoue |
| 7,824,479 | B2 | 11/2010 | Rowley |
| 7,833,305 | B1 | 11/2010 | Studer |
| 7,871,038 | B2 | 1/2011 | Space et al. |
| 2003/0185720 | A1 | 10/2003 | Tom et al. |
| 2013/0030718 | A1 | 1/2013 | Williams |
| 2013/0327891 | A1 | 12/2013 | Zhang |

OTHER PUBLICATIONS

Parthasarathy, Ventilation Relevant Contaminants of Concern in Commercial Buildings Screening Process and Results, Ernest Orlando Lawrence Berkeley National Laboratory, Apr. 29, 2011.
Hall, A Portable Wireless Particulate Sensor System for Continuous Real Time Environmental Monitoring, Boise State University ScholarWorks, Jul. 15, 2012.
Hall, Monitoring Aircraft Cabin Particulate Matter Using a Wireless Sensor Network, Boise State University Scholar Works, Jul. 14, 2013.
Abraham, The biological and toxicological activity of gases and vapors, Toxicology in Vitro 24 (2010) 357-362.
Devos, Standardized Human Olfactory Threshold, IRL Press, Oxford University Press, 1990.
Logue, Hazard Assessment of Chemical Air Contaminants Measured in Residences, Ernest Orlando Lawrence Berkeley National Laboratory, Jun. 2010.
Molhave, Human Reactions to Low Concentrations of Volatile Organic Compounds, Environmental International, vol. 12, pp. 167-175, 1986.
The PID Handbook, Third Edition, RAE Systems Inc., 2013.
BASF Aerospace Materials, Dual Ozone/VOC catalytic converter, Aug. 2011.
Grady, Vehicle Cabin Air Quality with Fractional Air Recirculation, SAE International, Apr. 8, 2013.
RAE Systems, http://www.raesystems.com/sites/default/files/content/resources/Technical-Note-106_A-Guideline-for-Pid-Instrument-Response_07-14.pdf (Jan. 18, 2015).
EP search report dated Jun. 22, 2016 in application No. 16152495.4.

| COMPOUND | NON-ZERO SAMPLE SIZE | TOTAL SAMPLE SIZE | FREQUENCE OF OCCURANCE (%)=NON-ZERO SAMPLE SIZE/ TOTAL SAMPLE SIZE |
|---|---|---|---|
| ACETONE (2-PROPANONE) | 191 | 195 | 0.98 |
| ACETALDEHYDE (ETHANAL) | 264 | 282 | 0.94 |
| TRICHLOROFLUOROMETHANE | 194 | 214 | 0.91 |
| FORMALDEHYDE | 257 | 281 | 0.91 |
| TOLUENE | 184 | 214 | 0.86 |
| CARBON MONOXIDE | 189 | 255 | 0.74 |
| M-XYLENE (1,3-DIMETHYLBENZENE) | 155 | 214 | 0.72 |
| O-XYLENE (1,2-DIMETHYLBENZE) | 155 | 214 | 0.72 |
| TOTAL XYLENE | 155 | 214 | 0.72 |
| 2-BUTANONE (METHYL ETHYL KETONE) | 136 | 215 | 0.63 |
| CHLOROMETHANE | 124 | 214 | 0.58 |
| TCP ISOMERS- MIXED | 53 | 94 | 0.56 |
| OCTANE | 118 | 214 | 0.55 |
| N-UNDECANE | 118 | 214 | 0.55 |
| N-DECANE | 117 | 215 | 0.54 |
| BENZENE | 114 | 216 | 0.53 |
| ACETONITRILE | 102 | 213 | 0.48 |
| TRICHLOROTRIFLUOROETHANE | 96 | 213 | 0.45 |
| 2-PROPANOL (ISOPROPYL ALCOHOL) | 95 | 215 | 0.44 |
| N-DODECANE | 90 | 215 | 0.42 |
| BENZALDEHYDE | 118 | 282 | 0.42 |
| ETHYL BENZENE | 87 | 214 | 0.41 |
| PROPIONALDEHYDE (2-PROPYNAL) | 111 | 279 | 0.4 |
| N-NONANE | 84 | 215 | 0.39 |
| TETRACHLOROETHENE (PERCHLORETHYLENE) | 81 | 215 | 0.38 |
| BUTANAL (BUTYRALDEHYDE) | 106 | 281 | 0.38 |
| 1,2,4-TRIMETHYLBENZENE (PSEUDOCUMENE) | 80 | 216 | 0.37 |
| 1,3,5-TRIMETHYLBENZENE (MESITYLENE) | 80 | 216 | 0.37 |
| ETHANOL (ETHYL ALCOHOL) | 76 | 212 | 0.36 |

FIG. 3A continued from FIG. 3A ② continued from FIG. 3A ②

| | | | |
|---|---|---|---|
| CARBON DISULFIDE | 68 | 216 | 0.31 |
| PENTANAL (VALERALDEHYDE) | 87 | 282 | 0.31 |
| 2-METHYLBUTANE | 57 | 215 | 0.27 |
| MTBE | 47 | 215 | 0.22 |
| PHENOL | 26 | 125 | 0.21 |
| CROTONALDEHYDE (TRANS-2-BUTENAL) | 60 | 282 | 0.21 |
| PHENANTHRENE | 19 | 95 | 0.2 |
| N-HEPTANE | 41 | 213 | 0.19 |
| PENTANE | 40 | 216 | 0.19 |
| METHYLCYCLOPENTANE | 35 | 215 | 0.16 |
| HEXANAL | 32 | 215 | 0.15 |
| 1,1,1-TRICHLOROETHANE | 31 | 215 | 0.14 |
| STYRENE (VINYL BENZENE) | 28 | 215 | 0.13 |
| VINYL ACETATE | 28 | 216 | 0.13 |
| BUTANE | 26 | 216 | 0.12 |
| 3-METHYLHEXANE | 23 | 214 | 0.11 |
| N-NONANAL | 19 | 215 | 0.09 |
| 2-METHYLPENTANE | 17 | 214 | 0.08 |
| ETHYL ACETATE | 15 | 215 | 0.07 |
| 2-HEXANONE (METHYL N-BUTYLKETONE) | 14 | 215 | 0.07 |
| N-OCTANAL | 15 | 216 | 0.07 |
| PROPANE | 13 | 215 | 0.06 |
| CHLOROETHANE | 14 | 216 | 0.06 |
| N-HEPTANAL | 14 | 216 | 0.06 |
| NAPHTHALENE | 14 | 216 | 0.06 |
| CYCLOHEXANE | 11 | 213 | 0.05 |
| ACROLEIN (2-PROPENAL) | 6 | 194 | 0.03 |
| P-CYMENE | 7 | 216 | 0.03 |
| TOCP | 1 | 100 | 0.01 |
| ISOBUTYRALDEHYDE | 2 | 216 | 0.01 |
| ISOVALERALDEHYDE | 1 | 282 | 0.01 |

FIG. 3B

| COMPOUND | MEAN ug/m3 | MEAN PPM | 75th PCNTL ug/m3 | 75th PCNTL PPM | 90th PCNTL ug/m3 | 90th PCNTL PPM | 95th PCNTL ug/m3 | 95th PCNTL PPM | 99th PCNTL ug/m3 | 99th PCNTL PPM |
|---|---|---|---|---|---|---|---|---|---|---|
| ACETALDEHYDE (ETHANAL) | 14 | 0.008 | 15 | 0.008 | 31 | 0.017 | 51 | 0.028 | 154 | 0.085 |
| ACETONITRILE | 30 | 0.018 | 24 | 0.014 | 80 | 0.048 | 163 | 0.097 | 741 | 0.441 |
| ACETONE (2-PROPANONE) | 71 | 0.030 | 110 | 0.046 | 185 | 0.078 | 243 | 0.102 | 377 | 0.159 |
| ACROLEIN (2-PROPENAL) | 0.5 | 0.000 | 1.1 | 0.000 | 0.8 | 0.000 | 0.9 | 0.000 | 22.1 | 0.010 |
| BENZALDEHYDE | 1.2 | 0.000 | 1.5 | 0.000 | 3.1 | 0.001 | 5.1 | 0.001 | 15 | 0.003 |
| BENZENE | 1.2 | 0.000 | 1.9 | 0.001 | 3.8 | 0.001 | 5.5 | 0.002 | 10.2 | 0.003 |
| BUTANAL (BUTYRALDEHYDE) | 1.8 | 0.001 | 1.6 | 0.001 | 5.3 | 0.002 | 10.2 | 0.003 | 31.1 | 0.011 |
| BUTANE | 1.2 | 0.001 |  | 0.000 | 6.2 | 0.003 | 13 | 0.005 | 31 | 0.013 |
| 2-BUTANONE (METHYL ETHYL KETONE) | 4.3 | 0.001 | 7.2 | 0.002 | 12 | 0.004 | 16 | 0.005 | 25 | 0.008 |
| CARBON DISULFIDE | 1.8 | 0.001 | 2.2 | 0.001 | 6.6 | 0.002 | 11 | 0.004 | 28 | 0.009 |
| CROTONALDEHYDE (TRANS-2-BUTENAL) | 1 | 0.000 | 0.8 | 0.000 | 2.8 | 0.001 | 5.9 | 0.002 | 22.3 | 0.008 |
| CYCLOHEXANE | 0.7 | 0.000 |  | 0.000 |  | 0.000 | 7.6 | 0.002 | 32.5 | 0.009 |
| N-DECANE | 8.6 | 0.001 | 10 | 0.002 | 26 | 0.004 | 46 | 0.008 | 127 | 0.022 |
| ETHANOL (ETHYL ALCOHOL) | 23 | 0.012 | 22 | 0.012 | 79 | 0.042 | 145 | 0.077 | 410 | 0.218 |
| ETHYL ACETATE | 1.5 | 0.000 | 0 | 0.000 | 0.9 | 0.000 | 4.5 | 0.001 | 116 | 0.032 |
| ETHYL BENZENE | 0.8 | 0.000 | 1.5 | 0.000 | 3 | 0.001 | 4 | 0.001 | 6.8 | 0.002 |
| FORMALDEHYDE | 12 | 0.010 | 16 | 0.013 | 28 | 0.023 | 39 | 0.031 | 81 | 0.065 |
| N-HEPTANE | 0.9 | 0.000 | 0.5 | 0.000 | 2.3 | 0.001 | 6.4 | 0.002 | 44.9 | 0.011 |
| HEXANAL | 0.8 | 0.000 |  |  | 4 | 0.001 | 6.6 | 0.002 | 11 | 0.003 |
| ISOVALERALDEHYDE | 0.1 | 0.000 |  |  |  |  |  |  |  |  |
| NAPHTHALENE | 0.15 | 0.000 |  | 0.000 | 0.52 | 0.000 | 1 | 0.000 | 2.4 | 0.000 |
| N-NONANE | 2.6 | 0.000 | 3.4 | 0.001 | 9.4 | 0.002 | 15 | 0.003 | 33 | 0.006 |
| OCTANE | 1.8 | 0.000 | 0.5 | 0.000 | 1.6 | 0.000 | 6.7 | 0.001 | 123 | 0.026 |
| PENTANAL | 1.1 | 0.000 | 1.5 | 0.000 | 3.8 | 0.001 | 6.3 | 0.002 | 15.1 | 0.004 |
| PENTANE | 2.3 | 0.001 | 1.1 | 0.000 | 10 | 0.003 | 16 | 0.005 | 28 | 0.009 |
| PHENOL | 0.3 | 0.000 | 0.7 | 0.000 | 1.3 | 0.000 | 1.7 | 0.000 | 3 | 0.001 |
| 2-PROPANOL (ISOPROPYL ALCOHOL) | 38 | 0.015 | 42 | 0.017 | 138 | 0.056 | 250 | 0.102 | 717 | 0.292 |
| PROPIONALDEHYDE (2-PROPYNAL) | 6.2 | 0.003 | 3.9 | 0.002 | 16.3 | 0.007 | 34.9 | 0.015 | 124.2 | 0.052 |
| STYRENE (VINYL BENZENE) | 0.2 | 0.000 | 0.2 | 0.000 | 1.1 | 0.000 | 1.6 | 0.000 | 2.5 | 0.001 |

FIG. 4A continued from FIG. 4A ③

| | | | | | | | | | | |
|---|---|---|---|---|---|---|---|---|---|---|
| TETRACHLOROETHENE (PERCHLORETHYLENE) | 1.4 | 0.000 | 2 | 0.000 | 5.2 | 0.001 | 8.4 | 0.001 | 18.5 | 0.003 |
| TOLUENE | 7.3 | 0.002 | 11 | 0.003 | 21 | 0.006 | 30 | 0.008 | 53 | 0.014 |
| 1,3,5-TRIMETHYLBENZENE (MESITYLENE) | 0.1 | 0.000 | 0.4 | 0.000 | 0.7 | 0.000 | 1 | 0.000 | 1.9 | 0.000 |
| N-UNDECANE | 10 | 0.002 | 11 | 0.002 | 30 | 0.005 | 58 | 0.009 | 244 | 0.038 |
| VINYL ACETATE | 0.5 | 0.000 | 0.4 | 0.000 | 2.4 | 0.001 | 4.5 | 0.001 | 10.3 | 0.003 |
| TOTAL XYLENE | 4.3 | 0.001 | 6.8 | 0.002 | 13 | 0.003 | 18 | 0.004 | 32 | 0.007 |
| M-XYLENE (1,3-DIMETHYLBENZENE) | 3.2 | 0.001 | 4.9 | 0.001 | 9.1 | 0.002 | 13 | 0.003 | 22 | 0.005 |
| O-XYLENE (1,2-DIMETHYLBENZE) | 1.3 | 0.000 | 1.9 | 0.000 | 3.9 | 0.001 | 5.6 | 0.001 | 11 | 0.003 |
| P-XYLENE (1,4-DIMETHYLBENZENE) | | 0.000 | | 0.000 | | 0.000 | | 0.000 | | 0.000 | continued from FIG. 4A ③

FIG. 4B

| COMPOUND- PPM EQUIVALENTS USING A 10.6EV LAMP | FACTOR FOR DENOMINATOR | ISOBUTYLENE EQUIVALENTS FOR MEAN | ISOBUTYLENE EQUIVALENTS FOR 75th PERCENTILE | ISOBUTYLENE EQUIVALENTS FOR 90th PERCENTILE | ISOBUTYLENE EQUIVALENTS FOR 95th PERCENTILE | ISOBUTYLENE EQUIVALENTS FOR 99th PERCENTILE |
|---|---|---|---|---|---|---|
| ACETALDEHYDE (ETHANAL) | 6.0 | 0.001 | 0.001 | 0.003 | 0.005 | 0.014 |
| ACETONE (2-PROPANONE) | 1.1 | 0.027 | 0.042 | 0.071 | 0.093 | 0.144 |
| ACROLEIN (2-PROPENAL) | 3.9 | 0.000 | 0.000 | 0.000 | 0.000 | 0.010 |
| BENZENE | 0.5 | 0.001 | 0.001 | 0.002 | 0.003 | 0.006 |
| BUTANAL (BUTYRALDEHYDE) | 1.8 | 0.000 | 0.000 | 0.001 | 0.002 | 0.006 |
| 2-BUTANONE (METHYL ETHYL KETONE) | 0.9 | 0.002 | 0.003 | 0.005 | 0.006 | 0.009 |
| CARBON DISULFIDE | 1.2 | 0.000 | 0.001 | 0.002 | 0.003 | 0.007 |
| CROTONALDEHYDE (TRANS-2-BUTENAL) | 1.1 | 0.000 | 0.000 | 0.001 | 0.002 | 0.007 |
| CYCLOHEXANE | 1.4 | 0.000 | 0.000 | 0.000 | 0.002 | 0.007 |
| N-DECANE | 1.4 | 0.001 | 0.001 | 0.003 | 0.006 | 0.016 |
| ETHANOL (ETHYL ALCOHOL) | 10.0 | 0.001 | 0.001 | 0.004 | 0.008 | 0.022 |
| ETHYL ACETATE | 4.6 | 0.000 | 0.000 | 0.000 | 0.000 | 0.007 |
| ETHYL BENZENE | 0.5 | 0.000 | 0.001 | 0.001 | 0.002 | 0.003 |
| N-HEPTANE | 2.8 | 0.000 | 0.000 | 0.000 | 0.001 | 0.004 |
| NAPHTHALENE | 0.4 | 0.000 | 0.000 | 0.000 | 0.000 | 0.001 |
| N-NONANE | 1.4 | 0.000 | 0.000 | 0.001 | 0.002 | 0.004 |
| OCTANE | 1.8 | 0.000 | 0.000 | 0.000 | 0.001 | 0.015 |
| PENTANE | 8.4 | 0.000 | 0.000 | 0.001 | 0.002 | 0.004 |
| PHENOL | 1.0 | 0.000 | 0.000 | 0.000 | 0.001 | 0.015 |
| 2-PROPANOL (ISOPROPYL ALCOHOL) | 6.0 | 0.003 | 0.003 | 0.009 | 0.017 | 0.049 |
| PROPIONALDEHYDE (2-PROPYNAL) | 1.9 | 0.001 | 0.001 | 0.004 | 0.008 | 0.028 |
| STYRENE (VINYL BENZENE) | 0.4 | 0.000 | 0.000 | 0.001 | 0.001 | 0.001 |
| TETRACHLOROETHENE (PERCHLORETHYLENE) | 0.6 | 0.000 | 0.001 | 0.001 | 0.002 | 0.005 |
| TOLUENE | 0.5 | 0.004 | 0.006 | 0.011 | 0.016 | 0.028 |
| 1,3,5-TRIMETHYLBENZENE (MESITYLENE) | 0.4 | 0.000 | 0.000 | 0.000 | 0.001 | 0.001 |

| | | | | | | |
|---|---|---|---|---|---|---|
| N-UNDECANE | 2.0 | 0.001 | 0.001 | 0.002 | 0.005 | 0.019 |
| VINYL ACETATE | 1.2 | 0.000 | 0.000 | 0.001 | 0.001 | 0.002 |
| M-XYLENE (1,3-DIMETHYLBENZENE) | 0.4 | 0.002 | 0.003 | 0.005 | 0.007 | 0.012 |
| O-XYLENE (1,2-DIMETHYLBENZE) | 0.5 | 0.001 | 0.001 | 0.002 | 0.003 | 0.006 |
| MIXTURE ISOBUTYLENE EQUIVALENTS (PPM-V) | | 0.047 | 0.067 | 0.132 | 0.195 | 0.427 | continued from FIG. 4C continued from FIG. 4C

FIG. 4D

| COMPOUND | ODOR THRESHOLDS DEVOS ET AL. (1990) LOG 10 VOLUME | ODOR THRESHOLDS DEVOS ET AL. (1990) LOG 10 MASS | ODOR THRESHOLDS DEVOS ET AL. (1990) ppmV | ODOR THRESHOLDS DEVOS ET AL. (1990) ug/m^3 |
|---|---|---|---|---|
| N-OCTANAL | 8.87 | 8.14 | 0.0013 | 7.24 |
| P-CYMENE (4-METHYLCUMENE) (1-ISOPROPYL-4-METHYLBENZENE) | 8.67 | 7.92 | 0.0021 | 12.0 |
| N-NONANAL | 8.65 | 7.87 | 0.0022 | 13.5 |
| ETHYL BENZENE | 8.54 | 7.89 | 0.0029 | 12.9 |
| N-HEPTANAL | 8.32 | 7.64 | 0.0048 | 22.9 |
| VALERALDEHYDE (PENTANAL) | 8.22 | 7.66 | 0.0060 | 21.9 |
| PHENANTHRENE | 8.11 | 7.24 | 0.0078 | 57.5 |
| BUTANAL (BUTYRALDEHYDE) | 8.05 | 7.56 | 0.0089 | 27.5 |
| HEXANAL | 7.86 | 7.24 | 0.0138 | 57.5 |
| NAPHTHALENE | 7.83 | 7.1 | 0.0148 | 79.4 |
| ISOBUTYRALDEHYDE (2-METHYLPROPANAL) | 7.39 | 6.91 | 0.0407 | 123 |
| BENZALDEHYDE | 7.38 | 6.73 | 0.0417 | 186 |
| CARBON DISULFIDE | 7.02 | 6.52 | 0.0955 | 302 |
| PROPIONALDEHYDE (2-PROPYNAL) | 7.01 | 6.66 | 0.0977 | 219 |
| PHENOL | 6.96 | 6.37 | 0.1096 | 427 |
| CROTONALDEHYDE (TRANS-2-BUTENAL) | 6.87 | 6.41 | 0.1349 | 389 |
| STYRENE (VINYL BENZENE) | 6.84 | 6.2 | 0.1445 | 631 |
| 1,2,4-TRIMETHYLBENZENE (PSEUDOCUMENE) | 6.81 | 6.11 | 0.155 | 776 |
| 2-HEXANONE | 6.78 | 6.15 | 0.166 | 708 |
| ACROLEIN (2-PROPENAL) | 6.76 | 6.39 | 0.174 | 407 |
| ACETALDEHYDE (ETHANAL) | 6.73 | 6.47 | 0.186 | 339 |
| 1,3,5-TRIMETHYLBENZENE (MESITYLENE) | 6.64 | 5.94 | 0.229 | 1148 |
| M-XYLENE (1,3-DIMETHYLBENZENE) | 6.49 | 5.85 | 0.324 | 1413 |
| P-XYLENE (1,4-DIMETHYLBENZENE) | 6.31 | 5.67 | 0.490 | 2138 |
| VINYL ACETATE | 6.22 | 5.66 | 0.603 | 2188 |

FIG. 5A continued from FIG. 5A (5)

continued from FIG. 5A (5)

| | | | | |
|---|---|---|---|---|
| N-DECANE | 6.13 | 5.36 | 0.741 | 4365 |
| O-XYLENE (1,2-DIMETHYLBENZENE) | 6.07 | 5.42 | 0.851 | 3802 |
| FORMALDEHYDE (METHANAL) | 6.06 | 5.97 | 0.871 | 1072 |
| N-UNDECANE | 5.93 | 5.11 | 1.17 | 7762 |
| N-NONANE | 5.9 | 5.17 | 1.26 | 6761 |
| TOLUENE | 5.81 | 5.23 | 1.55 | 5888 |
| N-DODECANE | 5.69 | 4.84 | 2.04 | 14454 |
| ETHYL ACETATE | 5.58 | 5.01 | 2.63 | 9772 |
| BENZENE | 5.44 | 4.92 | 3.63 | 12023 |
| CHLOROETHANE | 5.39 | 4.96 | 4.07 | 10965 |
| OCTANE | 5.24 | 4.56 | 5.75 | 27542 |
| TETRACHLOROETHENE (PERCHLOROETHYLENE) | 5.21 | 4.37 | 6.17 | 42658 |
| 2-BUTANONE (METHYL ETHYL KETONE) | 5.11 | 4.63 | 7.76 | 23442 |
| N-HEPTANE | 5.01 | 4.39 | 9.77 | 40738 |
| CHLOROMETHANE | 4.99 | 4.67 | 10 | 21380 |
| 2-PROPANOL (ISOPROPYL ALCOHOL) | 4.99 | 4.59 | 10 | 25704 |
| ACETONE (2-PROPANONE) | 4.84 | 4.46 | 14 | 34674 |
| CYCLOHEXANE | 4.66 | 4.11 | 22 | 77625 |
| 1,1,1-TRICHLOROETHANE (METHYL CHLOROFORM) | 4.65 | 3.9 | 22 | 125893 |
| ETHANOL (ETHYL ALCOHOL) | 4.54 | 4.26 | 29 | 54954 |
| PENTANE | 4.5 | 4.02 | 32 | 95499 |
| ACETONITRILE (ETHANENITRILE) | 4.01 | 3.78 | 98 | 165959 |
| BUTANE | 3.69 | 3.31 | 204 | 489779 |
| PROPANE | 2.57 | 2.31 | 2692 | 4897788 |

FIG. 5B

| COMPOUND | MEAN PPM | 75th PCNTL PPM | 90th PCNTL PPM | 95th PCNTL PPM | 99th PCNTL PPM | DA-MEAN PPM | DA-75th PCNTL PPM | DA-90th PCNTL PPM | DA-95th PCNTL PPM | DA-99th PCNTL PPM |
|---|---|---|---|---|---|---|---|---|---|---|
| 2-BUTANONE (METHYL ETHYL KETONE) | 0.001 | 0.002 | 0.004 | 0.005 | 0.008 | 0.000129 | 0.000258 | 0.000515 | 0.000644 | 0.001031 |
| 2-PROPANOL (ISOPROPYL ALCOHOL) | 0.015 | 0.017 | 0.056 | 0.102 | 0.292 | 0.0015 | 0.0017 | 0.0056 | 0.0102 | 0.0292 |
| ACETALDEHYDE (ETHANAL) | 0.008 | 0.008 | 0.017 | 0.028 | 0.085 | 0.043011 | 0.043011 | 0.091398 | 0.150538 | 0.456989 |
| ACETONE (2-PROPANONE) | 0.03 | 0.046 | 0.078 | 0.102 | 0.159 | 0.002143 | 0.003286 | 0.005571 | 0.007286 | 0.011357 |
| ACETONITRILE (ETHANENITRILE) | 0.018 | 0.014 | 0.048 | 0.097 | 0.441 | 0.000184 | 0.000143 | 0.000049 | 0.000099 | 0.0045 |
| ACROLEIN (2-PROPENAL) | 0 | 0 | 0 | 0 | 0.01 | 0 | 0 | 0 | 0 | 0.057471 |
| BENZALDEHYDE | 0 | 0 | 0.001 | 0.001 | 0.003 | 0 | 0 | 0.023981 | 0.023981 | 0.071942 |
| BENZENE | 0 | 0.001 | 0.001 | 0.002 | 0.003 | 0 | 0.000275 | 0.000275 | 0.000551 | 0.000826 |
| BUTANAL (BUTYRALDEHYDE) | 0.001 | 0.001 | 0.002 | 0.003 | 0.011 | 0.11236 | 0.11236 | 0.224719 | 0.337079 | 1.235955 |
| BUTANE | 0.001 | 0 | 0.003 | 0.005 | 0.013 | 4.9E-06 | 0 | 1.47E-05 | 2.45E-05 | 6.37E-05 |
| CARBON DISULFIDE | 0.001 | 0.001 | 0.002 | 0.004 | 0.009 | 0.010471 | 0.010471 | 0.020942 | 0.0041885 | 0.094241 |
| CROTONALDEHYDE (TRANS-2-BUTENAL) | 0 | 0 | 0.001 | 0.002 | 0.008 | 0 | 0 | 0.007413 | 0.014826 | 0.059303 |
| CYCLOHEXANE | 0 | 0 | 0 | 0.002 | 0.009 | 0 | 0 | 0 | 9.09E-05 | 0.000409 |
| ETHANOL (ETHYL ALCOHOL) | 0.012 | 0.012 | 0.042 | 0.077 | 0.218 | 0.000414 | 0.000414 | 0.001448 | 0.002655 | 0.007517 |
| ETHYL ACETATE | 0 | 0 | 0 | 0.001 | 0.032 | 0 | 0 | 0 | 0.000038 | 0.012167 |
| ETHYL BENZENE | 0 | 0 | 0.001 | 0.001 | 0.002 | 0 | 0 | 0.344828 | 0.344828 | 0.689655 |
| FORMALDEHYDE (METHANAL) | 0.01 | 0.013 | 0.023 | 0.031 | 0.065 | 0.011481 | 0.014925 | 0.026406 | 0.035591 | 0.074627 |
| HEXANAL | 0 | | 0.001 | 0.002 | 0.003 | 0 | 0 | 0.072464 | 0.144928 | 0.217391 |

FIG. 5C 6 continued to FIG. 5D 6 continued to FIG. 5D continued from FIG. 5C ⑥ | | | | | | | | | | continued from FIG. 5C ⑥

| | | | | | | | | | | |
|---|---|---|---|---|---|---|---|---|---|---|
| N-DECANE | 0.001 | 0.002 | 0.004 | 0.008 | 0.022 | 0.00135 | 0.002699 | 0.005398 | 0.010796 | 0.02969 |
| N-HEPTANE | 0 | 0 | 0.001 | 0.002 | 0.011 | 0 | 0 | 0.000102 | 0.000205 | 0.001126 |
| N-NONANE | 0 | 0.001 | 0.002 | 0.003 | 0.006 | 0 | 0.000794 | 0.001587 | 0.002381 | 0.004762 |
| N-UNDECANE | 0.002 | 0.002 | 0.005 | 0.009 | 0.038 | 0.001709 | 0.001709 | 0.004274 | 0.007692 | 0.032479 |
| OCTANE | 0 | 0 | 0 | 0.001 | 0.026 | 0 | 0 | 0 | 0.000174 | 0.004522 |
| O-XYLENE (1,2-DIMETHYLBENZENE) | 0 | 0 | 0.001 | 0.001 | 0.003 | 0 | 0 | 0.001175 | 0.001175 | 0.003525 |
| PENTANE | 0.001 | 0 | 0.003 | 0.005 | 0.009 | 3.13E-05 | 0 | 9.38E-05 | 0.000156 | 0.000281 |
| PHENOL | 0 | 0 | 0 | 0 | 0.001 | 0 | 0 | 0 | 0 | 0.009214 |
| PROPIONALDEHYDE (2-PROPYNAL) | 0.003 | 0.002 | 0.007 | 0.015 | 0.052 | 0.030706 | 0.020471 | 0.071648 | 0.153531 | 0.532242 |
| STYRENE (VINYL BENZENE) | 0 | 0 | 0 | 0 | 0.001 | 0 | 0 | 0 | 0 | 0.006920 |
| TETRACHLOROETHENE (PERCHLOROETHYLENE) | 0 | 0 | 0.001 | 0.001 | 0.003 | 0 | 0 | 0.000162 | 0.000162 | 0.000486 |
| TOLUENE | 0.002 | 0.003 | 0.006 | 0.008 | 0.014 | 0.00129 | 0.001935 | 0.003871 | 0.005161 | 0.009032 |
| VALERALDEHYDE (PENTANAL) | 0 | 0 | 0.001 | 0.002 | 0.004 | 0 | 0 | 0.166667 | 0.333333 | 0.666667 |
| VINYL ACETATE | 0 | 0 | 0.001 | 0.001 | 0.003 | 0 | 0 | 0.001658 | 0.001658 | 0.004975 |
| Dose Addition - Odor For Mixture | | | | | | 0.217 | 0.214 | 1.083 | 1.633 | 4.330 |

FIG. 5D

| COMPOUND | LOG(1/SIT) | ppmV - EQUATION (3) | ug/M3 |
|---|---|---|---|
| 2-METHYLPENTANE | -5.14 | 0.000007 | 0.025534516 |
| 3-METHYLHEXANE | -5.08 | 0.000008 | 0.034087006 |
| ACETALDEHYDE | 3.29 | 1949.844600 | 3512910.209 |
| ACETONITRILE | 3.29 | 1949.844600 | 3273665.473 |
| ACETOPHENONE | 2.01 | 102.329299 | 502857.4766 |
| ACROLEIN (2-PROPANAL) | 0.32 | 2.089296 | 4790.427039 |
| BENZALDEHYDE | 2.52 | 331.131121 | 1437203.87 |
| BUTYRALDEHYDE | -4.77 | 0.000017 | 0.050086033 |
| BENZYL ALCOHOL | -0.69 | 0.204174 | 903.0410689 |
| BUTANE | 0.54 | 3.467369 | 8242.2682 |
| BUTANONE (MEK) | -3.38 | 0.000417 | 1.229466308 |
| CARBON DISULFIDE | 3.13 | 1348.962883 | 4200764.209 |
| CROTONALDEHYDE | 0.55 | 3.548134 | 10171.31716 |
| CYCLOHEXANONE | 2.88 | 758.577575 | 3045169.284 |
| ETHANOL | -4.76 | 0.000017 | 0.032744574 |
| ETHYL ACETATE | -4.83 | 0.000015 | 0.053299323 |
| ETHYLBENZENE | -4 | 0.000100 | 0.434233129 |
| FORMALDEHYDE | 0.63 | 4.265795 | 5239.33863 |
| HEPTANAL | -3.13 | 0.000741 | 3.461873348 |
| HEXALDEHYDE | -3.7 | 0.000200 | 0.817354923 |
| HEXAN-2-ONE | 3.21 | 1621.810097 | 6643783.205 |
| HEXANE | 1.46 | 28.840315 | 101654.7382 |
| METHYL TERT-BUTYL ETHER | 3.14 | 1380.384265 | 4978416.542 |
| NAPHTHALENE | 5.95 | 891250.938134 | 4672050419 |
| NONANE | 1.95 | 89.125094 | 467314.3978 |
| OCTANAL | -3.24 | 0.000575 | 3.017517597 |
| OCTANE | 1.77 | 58.884366 | 275106.7924 |
| PENTANAL | -4.57 | 0.000027 | 0.094817212 |

FIG. 6A

| | | | |
|---|---|---|---|
| PENTANE | 0.9 | 7.943282 | 23439.99269 |
| PHENANTHRENE | 8.1 | 125892541.179417 | 9.17703E+11 |
| PHENOL | 2.22 | 165.958691 | 638788.2366 |
| PROPAN-2-OL (ISOPROPYL ALCOHOL) | -4.26 | 0.000055 | 0.135081417 |
| PROPANE | 0.03 | 1.071519 | 1932.678992 |
| PROPIONALDEHYDE | 3.76 | 5754.399373 | 13669346.24 |
| PROPYLBENZENE | -3.43 | 0.000372 | 1.826372973 |
| STYRENE | -3.11 | 0.000776 | 3.306590478 |
| TOLUENE | -4.47 | 0.000034 | 0.127693663 | continued from FIG. 6A (7)

FIG. 6B

| COMPOUND | PPM Mean:SIT | PPM 0.75P:SIT | PPM 0.9P:SIT | PPM 0.95P:SIT | PPM 0.99P:SIT | PPM 1.0P:SIT |
|---|---|---|---|---|---|---|
| 2-METHYLPENTANE | 155.2002 | 55.49106 | 448.8481 | 972.7911 | 3418.097 | 7832.535 |
| 2-PROPANOL (ISOPROPYL ALCOHOL) | 278.7948 | 307.4771 | 1019.383 | 1849.059 | 5308.183 | 5182.06 |
| 3-METHYLHEXANE | 28.04807 | -17.2168 | 92.19709 | 224.3292 | 760.9728 | 880.1008 |
| ACETALDEHYDE (ETHANAL) | 3.9E-06 | 4.38E-06 | 8.94E-06 | 1.46E-05 | 4.39E-05 | 7.97E-05 |
| ACETONITRILE (ETHANENITRILE) | 9.18E-06 | 7.43E-06 | 2.44E-05 | 4.99E-05 | 0.000226 | 0.000247 |
| ACROLEIN (2-PROPENAL) | 0.000102 | 0.000237 | 0.000158 | 0.000178 | 0.004615 | 0.010437 |
| BENZALDEHYDE | 8.41E-07 | 1.08E-06 | 2.18E-06 | 3.54E-06 | 1.04E-05 | 1.67E-05 |
| BUTANAL (BUTYRALDEHYDE) | 35.85293 | 31.52096 | 105.2919 | 203.2331 | 621.7035 | 1217.904 |
| BUTANE | 0.000149 | -0.00028 | 0.000748 | 0.001615 | 0.003795 | 0.002427 |
| 2-BUTANONE (METHYL ETHYL KETONE) | 3.465069 | 5.871804 | 9.858502 | 12.9083 | 20.46297 | 21.14739 |
| CARBON DISULFIDE | 4.23E-07 | 5.17E-07 | 1.56E-06 | 2.71E-06 | 6.78E-06 | 6.19E-06 |
| CROTONALDEHYDE (TRANS-2-BUTENAL) | 9.5E-05 | 7.53E-05 | 0.000272 | 0.000576 | 0.002192 | 0.004916 |
| ETHANOL (ETHYL ALCOHOL) | 713.2393 | 675.1734 | 2400.715 | 4424.294 | 12508.92 | 15269.71 |
| ETHYL ACETATE* | 28.92669 | -0.27614 | 17.70921 | 84.89819 | 2167.026 | 1407.067 |
| ETHYL BENZENE | 1.85578 | 3.499079 | 6.817811 | 9.280256 | 15.64018 | 14.04775 |
| FORMALDEHYDE (METHANAL) | 0.002204 | 0.0031 | 0.005254 | 0.007414 | 0.015425 | 0.020995 |
| HEXANAL | 0.939674 | -0.94273 | 4.858988 | 8.084214 | 13.74325 | 24.46891 |
| MTBE | 1.42E-07 | 1.33E-07 | 5.34E-07 | 1.07E-06 | 3.45E-06 | 2.61E-06 |
| NAPHTHALENE* | 3.25E-11 | -1.2E-11 | 1.12E-10 | 2.14E-10 | 5.13E-10 | 2.14E-09 |
| N-NONANE | 5.62E-06 | 7.29E-06 | 2E-05 | 3.23E-05 | 6.99E-05 | 0.000107 |
| N-OCTANAL | 0.178896 | 1.390581 | 0.622264 | 1.591611 | 5.932363 | 9.942102 |
| OCTANE | 6.39E-06 | 1.96E-06 | 5.79E-06 | 2.43E-05 | 0.000448 | 0.000218 |
| PENTANE | 9.67E-05 | 4.71E-05 | 0.000445 | 0.000701 | 0.001213 | 0.001706 |
| PROPANE* | 0.000417 | 0.000554 | 0.004597 | 0.006755 | 99.09304 | 0.010348 |
| PROPIONALDEHYDE (PROPANAL) | 4.51E-07 | 2.86E-07 | 1.19E-06 | 2.55E-06 | 9.08E-06 | 1.61E-05 |
| STYRENE (VINYL BENZENE) | 0.054657 | 0.058121 | 0.325167 | 0.478945 | 0.75747 | 1.179349 |
| TOLUENE | 57.07838 | 84.94203 | 162.911 | 231.1642 | 415.1079 | 344.6121 |
| DOSE ADDITION TOTAL | 0.651819 | 0.573496 | 2.134775 | 4.011065 | 12.67784 | 16.10241 |

FIG. 6C

| COMPOUND | PREDICTED SENSORY IRRITANCY RATIO MEAN | PREDICTED SENSORY IRRITANCY RATIO 75th PERCENTILE | PREDICTED SENSORY IRRITANCY RATIO 90th PERCENTILE | PREDICTED SENSORY IRRITANCY RATIO 95th PERCENTILE | PREDICTED SENSORY IRRITANCY RATIO 99th PERCENTILE |
|---|---|---|---|---|---|
| | 0.5 | 0.75 | 0.9 | 0.95 | 0.99 |
| MIXTURE ISOBUTYLENE EQUIVALENTS | 0.047 | 0.067 | 0.132 | 0.195 | 0.427 |
| PREDICTED ODOR DETECT | 0.419 | 0.501 | 2.125 | 3.507 | 12.475 |
| PREDICTED IRRITANCY DETECT | 0.651819 | 0.573496 | 2.134775 | 4.011065 | 12.67784 |
| AVERAGE SENSORY RESPONSE | 0.53541 | 0.537248 | 2.129888 | 5.512533 | 12.57642 |
| ESTIMATE VOC MASS ug/M3 | 257 | 307 | 747 | 1255 | 3727 |

FIG. 7

HUMAN FACTORS APPROACH TO CONTROL CONTAMINANT CONCENTRATIONS IN AIRCRAFT SUPPLY AIR FROM ENGINE AND APU BLEED AIR AND GROUND AIR SOURCES, AND IN RECIRCULATED AIR BEING DELIVERED TO AIRCRAFT CABINS FOR THE OPTIMIZATION OF USER EXPERIENCE AND ENERGY CONSUMPTION

BACKGROUND OF THE INVENTION

The present invention generally relates to apparatus and methods for treatment of airstreams in an adaptive Environmental Control System (ECS) to remove contaminants.

ECSs of various types and complexity are used in military and civil airplanes, helicopter, and spacecraft applications. In aircraft for example, airflow may be circulated to occupied compartments, cargo compartments, and electronic equipment bays. Air containing many pollutants such as particulate matter, aerosols, and hydrocarbons may range in humidity from dry (<2%) to very humid and may be delivered in a heated condition to the cabin from the ECS.

Aircraft occupants are not exposed to a single chemical in isolation, and the effects of co-exposures to multiple chemicals are poorly understood. Exposure duration for crews can be 14+ hours. Crews can routinely be assigned to work a 14 hour duty day without a break. The duty day can be extended if there is a maintenance delay or weather. Some international crews are assigned to work a longer duty day. There are flight safety and security implications for not adequately protecting pilots (who must perform cognitively-demanding safety-sensitive flight duties) and cabin crew (who must maintain cabin safety and security). Specifically, manufacturers are currently required to ensure that aircraft systems are designed to provide—in operation, under normal conditions and during any probable failure—"a sufficient amount of uncontaminated air to enable the crewmembers to perform their duties without undue discomfort or fatigue, and to provide reasonable passenger comfort." It has been widely recognized by air accident investigators, regulators, and pilot groups that flight safety can be compromised when pilots are exposed to oil-based contaminants in the ventilation air entering from outside the aircraft through the main engine bleeds or APU bleed or other air sources including ground supplies and electric compressors. Requiring pilots to rely on their noses to identify the presence and location of bleed air contaminants prolongs the exposure for the pilots and/or cabin occupants, depending on the location of the contaminant source.

The industry accepted approach to verification of acceptability of aircraft cabin air quality has been to gather air samples through various forms of sample media to capture the range of contaminants that might be present. There are three US Environmental Protection Agency (EPA) methods that are accepted as guidance for sample collection and analysis for volatile and semi-volatile compounds and for aldehyde compounds that may create odor and create irritancy.

The sample methodology is inadequate to fully characterize all compounds with any given method, thus requiring the use of multiple methods. The analyst must also determine—based on equipment availability and laboratory capability—which methods to use.

As can be seen, there may be an ongoing need to interpret real-time air contaminant data and provide an indication of when the levels may increase beyond the range of acceptability to enable corrective action.

SUMMARY OF THE INVENTION

In one aspect of the present invention, an environmental control system (ECS) having contaminated air therein includes a sensor; an air purification subsystem; and a controller in communication with the sensor and air purification subsystem; wherein the sensor detects a contaminant in the outside air supplied through the engines, APU or other air sources including ground supplies and electric compressors; and generates a contaminant signal; wherein the controller compares the contaminant signal to a predicted sensory response threshold; wherein the predicted sensory response threshold is based on one of odor, irritancy, mass, or a combination thereof; and when the contaminant signal reaches the predicted sensory response threshold, commands the air purification subsystem to alter a condition in the contaminated air.

In another aspect of the present invention, a controller for an environmental control system (ECS) having a sensor and an air purification subsystem communicates with the sensor and air purification subsystem; receives a contaminant signal from the sensor; compares the contaminant signal to one of a contaminant concentration look up table and a contaminant mass look up table; and based on the comparison, commands the air purification subsystem to alter a condition of contaminated air in the ECS.

In yet another aspect of the present invention, a method of controlling contaminants in air in an environment includes creating a sample database of the contaminants in the air; calculating a contaminant concentration of a contaminant in the sample database; calculating a predicted sensory detection threshold of the contaminant; comparing the predicted sensory detection threshold to one of a contaminant concentration and contaminant mass in the air; and adjusting the air based on the comparison.

These and other features, aspects and advantages of the present invention will become better understood with reference to the following drawings, description and claims.

BRIEF DESCRIPTION OF THE DRAWINGS

FIG. 3A and FIG. 3B is a table depicting frequency of occurrence of contaminants in air samples according to an exemplary embodiment of the present invention;

FIG. 4A and FIG. 4B is a table depicting concentrations, at various percentiles, of contaminants in air samples according to an exemplary embodiment of the present invention;

FIG. 4C and FIG. 4D is a table depicting isobutyene equivalent concentrations, at various percentiles, of the contaminants in FIG. 4A and FIG. 4B according to an exemplary embodiment of the present invention;

FIG. 5A and FIG. 5B is a table depicting predicted odor detection thresholds of contaminants in air samples according to an exemplary embodiment of the present invention;

FIG. 5C and FIG. 5D is a table depicting odor concentrations, at various percentiles, of contaminants in FIG. 5A and FIG. 5B according to an exemplary embodiment of the present invention;

FIG. 6A and FIG. 6B is a table depicting predicted sensory irritancy detection thresholds of contaminants in air samples according to an exemplary embodiment of the present invention;

FIG. 6C is a table depicting predicted sensory irritancy concentrations, at various percentiles, of contaminants in FIG. 6A and FIG. 6B according to an exemplary embodiment of the present invention;

FIG. 7 is a table summarizing predicted, combined contaminant odor detection thresholds; predicted, combined contaminant sensory irritancy detection thresholds; predicted, combined contaminant sensory thresholds; combined contaminant equivalence concentrations; and combined contaminant mass;

DETAILED DESCRIPTION OF THE INVENTION

Figure 1A:
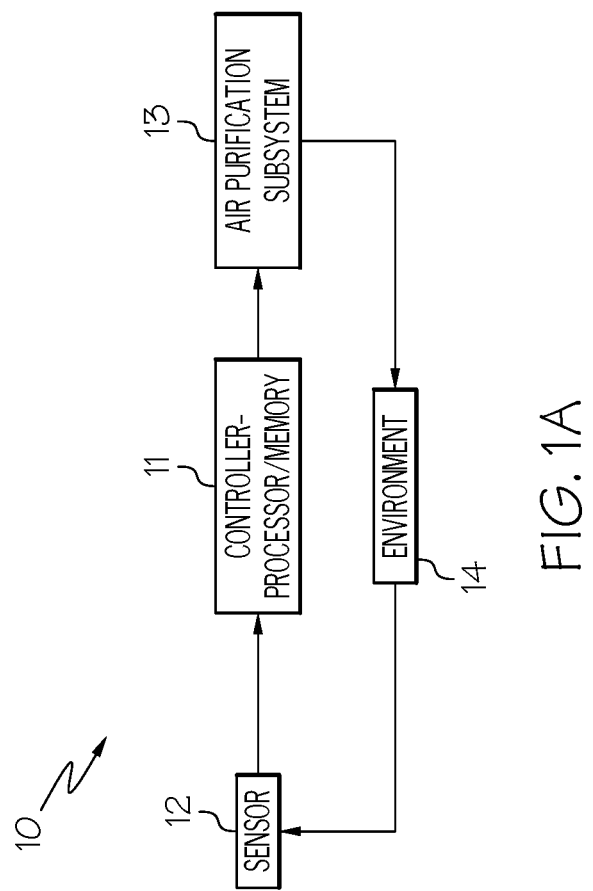
FIG. 1A is a block diagram of an environmental control system according to an exemplary embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may address only one of the problems discussed above. Further, one or more of the problems discussed above may not be fully addressed by any of the features described below.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable media having computer readable program code embodied thereon.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention generally provides an environmental control system (ECS) that can continuously adapt to changing contaminants—both in kind and degree—in contaminated air in the ECS. The contaminated air may include outside air entering the ECS through engines or APU, or other air sources including ground supplies and electric compressors, as well as recirculating air in the ECS. A controller of the ECS may receive contamination signals from one or more sensors that sense one or more contaminants in the contaminated air. The sensors may also sense total mass of the contaminants—without regard to the specific contaminants being sensed.

One or more of these contamination signals can then be compared against a predicted sensory response threshold and/or an average sensory response threshold. If the threshold is exceeded, the controller may send control signals to an air purification subsystem of the ECS to alter, for example, fan speed, air flow rate, or modulating the operating rate of an air purification system, or opening and closing valves to such an air purification system in the outside air and/or recirculating air entering, for example, an environment. The thresholds of the supply air, the recirculated air, and the cabin air may be different. The method of determining thresholds can be the same for each air source or location. The threshold of the outside air divided by its sensory limit times the flow rate, plus the threshold of the recirculated air divided by its sensory limit time the flow rate determines the total threshold of the cabin air. The environment may be a cabin of an aircraft or other vehicle, or other space such as a building intended to be occupied by humans. Once the contamination signal(s) drops below the total threshold of the cabin air, the controller may discontinue commanding the alteration of the contaminated air.

Generally, the present invention can include determining one or more sensory thresholds for contaminants, such as odor detection thresholds and/or sensory irritancy thresholds and/or mass thresholds. Based on one or more of the thresholds, the present invention may then predict one or more predicted sensory response thresholds. The predicted sensory response threshold can then be used to continuously compare it against actual contaminant levels, and thus enable continuous control of contaminants in the environment.

FIG. 1 is a block diagram of an ECS 10 according to an exemplary embodiment of the present invention. The ECS 10 may include a controller 11, such as a computer having a processor and a memory, in continuous or intermittent communication with an air purification subsystem 13 and one or more sensors 12. The sensors 12 may be positioned in various points throughout the ECS to sense contaminants in the outside air supplied through engine or APU bleeds, or other air sources including ground supplies and electric compressors, and/or recirculating air in the ECS and/or, in particular, an environment 14, such an aircraft cabin. The contaminants in the ECS may include, for example, OVCs and/or SVOCs and/or ultrafine particles (UFPs).

The sensor 12 can be any sensor capable of sensing the anticipated contaminants in the contaminated air. One or more of the sensors can sense the identity and amount of the individual contaminants in the contaminant air. In addition, one or more sensors can sense the mass of the contaminants without regard to the specific identity of the individual contaminants. For example, to sense individual contaminants, the sensor 12 may be a photoionization detector (PID), such as a PID by RAE Systems of San Jose, Calif. To sense total mass of contaminants, the sensor may also be a PID. These types of sensors and their operation is described in the PID Handbook (Third Edition), by RAE Systems Inc., which is incorporated herein by reference in its entirety.

An example configuration of multiple sensors in an ECS that can be employed in the present invention is shown, for example, in US patent application, entitled "Aircraft Environmental Control System That Optimizes the Proportion of Outside Air From Engines, APUs, Ground Air Conditioning Units and the Recirculated Cabin Air to Maintain Occupant Comfort and Maximize Fuel Economy," filed concurrently with this application and incorporated herein by reference in its entirety.

The air purification subsystem 13 may include various coolers, fans, and filters to alter the contaminated air. An example of an air purification subsystem that can be employed in the present invention is shown, for example, in US patent application, entitled "Aircraft Environmental Control System That Optimizes the Proportion of Outside Air From Engines, APUs, Ground Air Conditioning Units and the Recirculated Cabin Air to Maintain Occupant Comfort and Maximize Fuel Economy," filed concurrently with this application and incorporated herein by reference in its entirety.

Figure 1B:
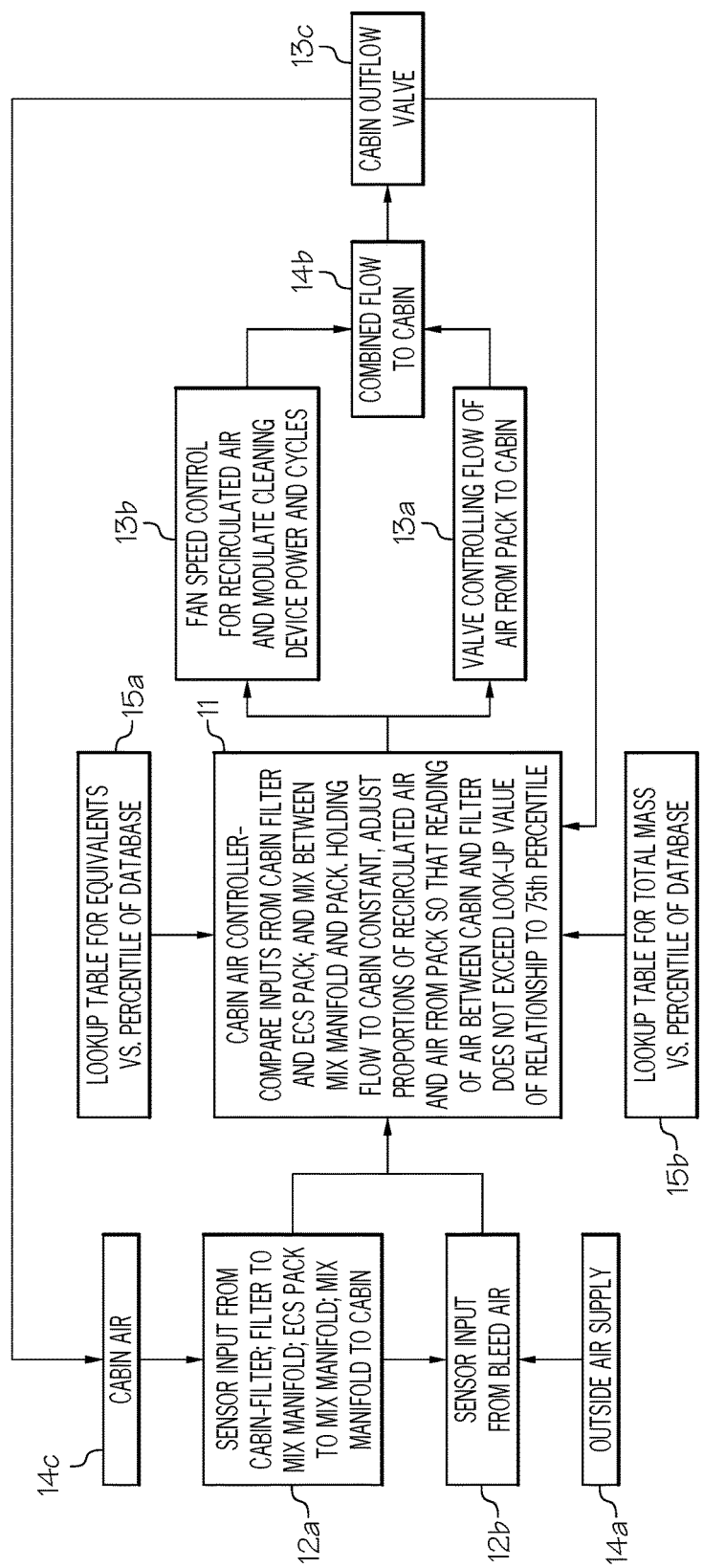
FIG. 1B is a block diagram of a controller that can be implemented in the system of FIG. 1A according to an exemplary embodiment of the present invention.

FIG. 1B is a functional block diagram of the controller 11 according to an exemplary embodiment of the present invention. The controller 11 include a processor (not shown) and a memory (not shown) that can store instructions to be executed by the processor to implement a method of removing contaminants from a space to be occupied by humans, such as the cabin of an aircraft, according to the present invention. The controller 11 may receive contamination signals from sensor(s) 12*a* which may sense contaminants from, for example, a cabin filter, a filter to a mix manifold, an ECS pack to a mix manifold, and the mix manifold to the cabin. The controller 11 may also receive contamination signals from sensor(s) 12*b* which may sense contaminants from bleed air.

The controller 11 may then compare the contamination signals to a contaminant concentration look up table 15*a* that may have information/data of contaminant concentration equivalents versus percentile of a sample database. The controller 11 may, in addition to or in lieu of the foregoing comparison, compare contamination signals to a contaminant mass look up table 15*b* that may have information/data of total mass of contaminants versus percentile of a sample database that may or may not the be same sample database in look up table 15*a*.

Based on the foregoing comparison(s), the controller 11 may then command a valve 13*a* to alter valve opening/closing and thereby alter a flow of outside air. Also, in addition to or in lieu of the foregoing command, the controller may command a fan 13*b* to alter a fan speed of recirculated air. Alternatively, the response of the controller may be to modulate an air purification device, increasing or decreasing its power to effect the desired change in air contaminant concentrations Either alone or in combination with commanding the valve 13*a* and the fan 13*b*, the controller may command an outflow valve 13*c* to open or close. The valve 13*c* may enable combined outside and recirculated air to enter the cabin as cabin air 14*c*.

Figure 2A:
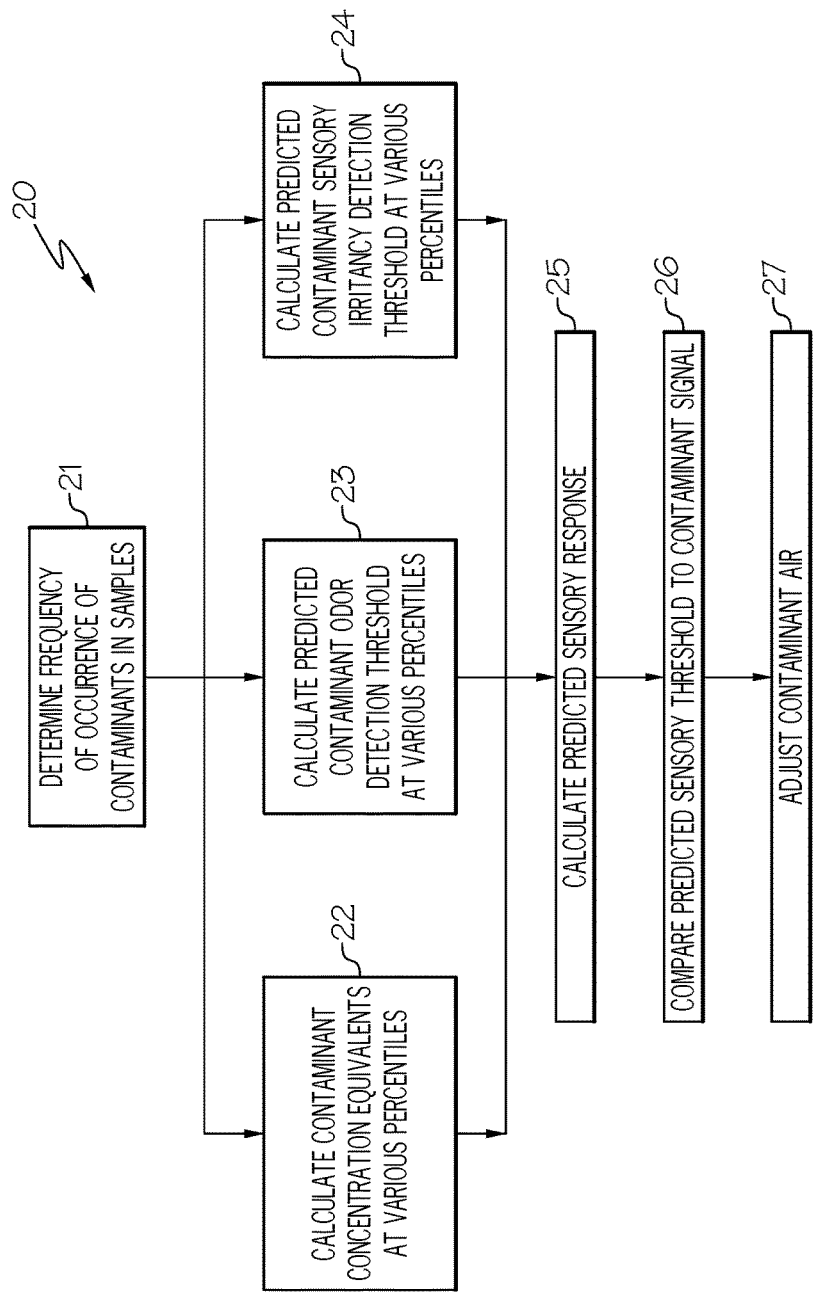
FIG. 2A is a flow chart of a method of controlling contaminants in an environmental control system according to an exemplary embodiment of the present invention.
Figure 2B:
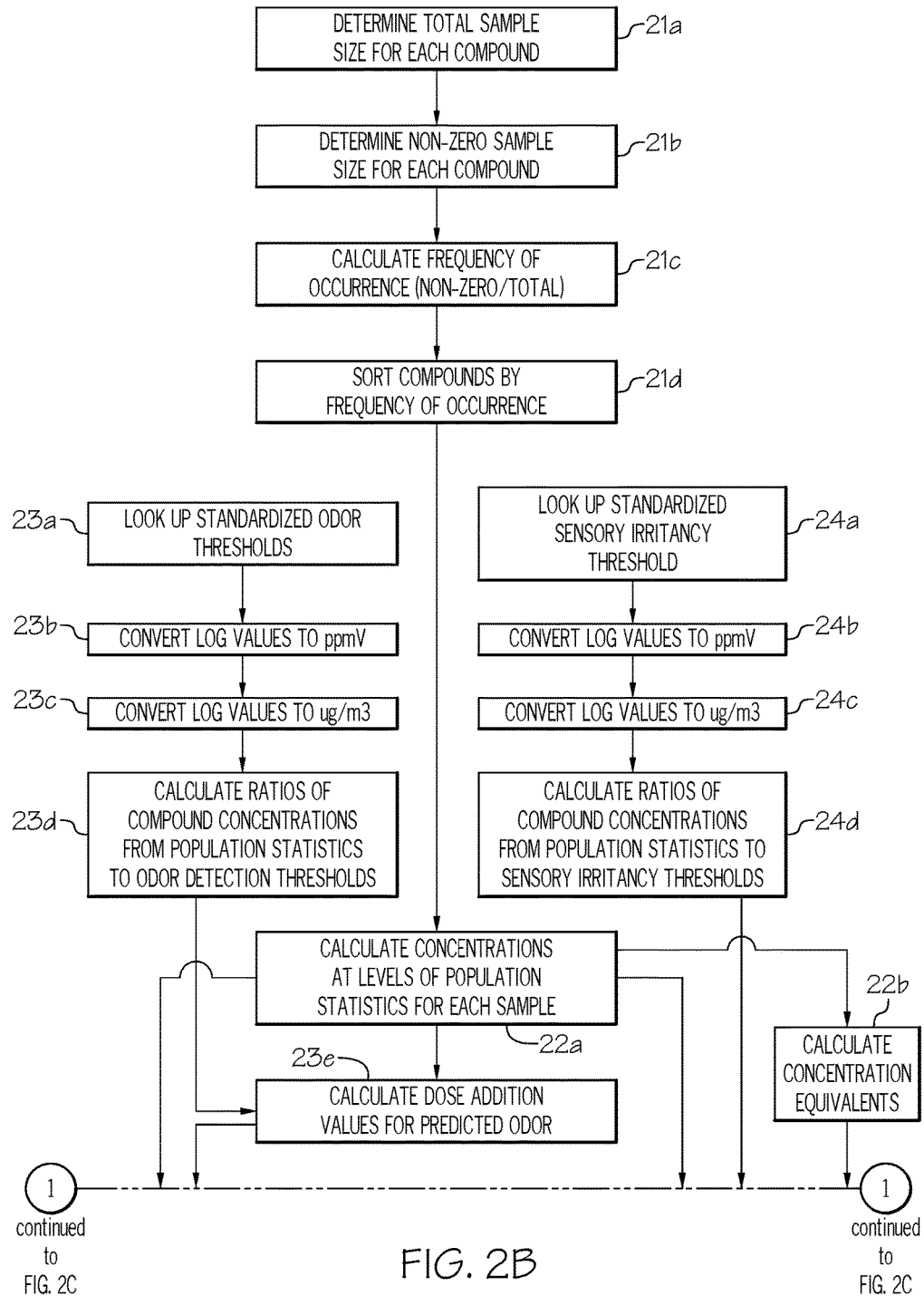
FIG. 2B and FIG. 2C is a flow chart of a method that can be implemented as part of the method of FIG. 2A.

FIG. 2A is a flow chart that depicts general exemplary steps of a method 20, which may be implemented by a controller, such as controller 11, of removing contaminants from an environment such as an aircraft cabin. FIG. 2B is a flow chart that depicts more specific steps that can be employed, according to an exemplary embodiment, to implement at least some of the general steps shown in FIG. 2A.

In FIG. 2A, the method 20 may generally include a step 21 for determining a frequency of occurrence of individual contaminants in samples of contaminated air that are expected to be present in the environment 14. In the example of an aircraft cabin, the samples may be outside air and engine bleed air.

A step 22 may generally include calculating individual contaminant concentration in the samples at various sample population percentiles, such as the 75th, 90th, 95th, and 99th percentiles, as well as calculating a mean concentration. This may include calculating individual "concentration equivalents" which refer to the concentrations of a calibration or equivalent compound (such as isobutylene) used by a sensor (such as a PID sensor by RAE Systems) to convert concentrations of different contaminants to concentrations of one calibration or equivalent compound, as further described in the PID Handbook (Third Edition), by RAE Systems Inc.

A step 23 may generally include calculating predicted, individual contaminant odor detection thresholds (i.e., responses) at various sample population percentiles, which can be the same or different percentiles as the contaminant concentration equivalents above, as well as a mean odor threshold.

A step 24 may generally include calculating predicted, individual contaminant sensory irritancy detection thresholds (i.e., responses) at various sample population percentiles, which can be the same or different percentiles as the contaminant concentration equivalents and/or odor thresholds above, as well as a mean irritancy threshold.

A step 25 may generally include, using the foregoing predicted sensory detection threshold(s)—i.e., odor thresholds and/or irritancy thresholds—for calculating predicted, combined contaminant sensory thresholds (i.e., responses) at various sample population percentiles, which can be the same or different percentiles as the contaminant concentration equivalents and/or odor thresholds and/or irritancy thresholds above, as well as a mean sensory threshold. The predicted, combined contaminant sensory thresholds may be average sensory responses (i.e., thresholds).

As can be appreciated, calculating predicted, combined contaminant sensory thresholds 25 need not be based on only odor and/or irritancy thresholds. Other sensory thresholds, such as contaminant mass thresholds, can be used to calculate the predicted, combined contaminant sensory thresholds. It can also be appreciated that step 25 need not be utilized in method 20 when, for example, a single predicted sensory detection threshold is used for the below described comparison to a contamination signal.

A step 26 may generally include comparing one or more predicted, combined contaminant sensory thresholds to one or more contaminant signals from one or more sensors. The contaminant signals can be based on a combination or mixture of the individual contaminant concentration equivalents determined in step 22. Step 26 may also include a comparison of the foregoing to a probability of contaminant detection by an occupant in an environment, such as environment 14.

A step 27 may generally include adjusting one or more of the contaminant air sources based on the foregoing comparison. The adjusting may occur prior to or when the contaminants reach a threshold of probability of contaminant detection.

FIG. 2B depicts exemplary sub-steps of the general steps 21 to 26, and such sub-steps are described below.

Referring again to FIG. 2A, step 21 may include collecting samples of contaminated air that may be expected to enter the environment 14. The samples may be collected at different times and from different sources to create a sample database. For example, in the context of an aircraft cabin, the present inventors used for experimental, exemplary purposes different contaminated air sources that included engine air and APU bleed air. In some instances, the samples came from engine test cells. In other instances, the samples came from engines and APUs installed on aircraft. Further, the experimental samples were acquired between 1996 and 2013; however, the present invention envisions a time frame that is longer or shorter than seventeen years. The total number of experimental samples exceeded two hundred; however, the present invention envisions more or less than two hundred samples.

In the experimental database, there was significant data scatter. Some of that scatter could be related to environmental conditions around the test area. The scatter could also be due to variation in sampling and laboratory analysis over the seventeen year period. This database indicates that there may be hundreds of different compounds and/or contaminants present in any given sample.

Figure 2C:
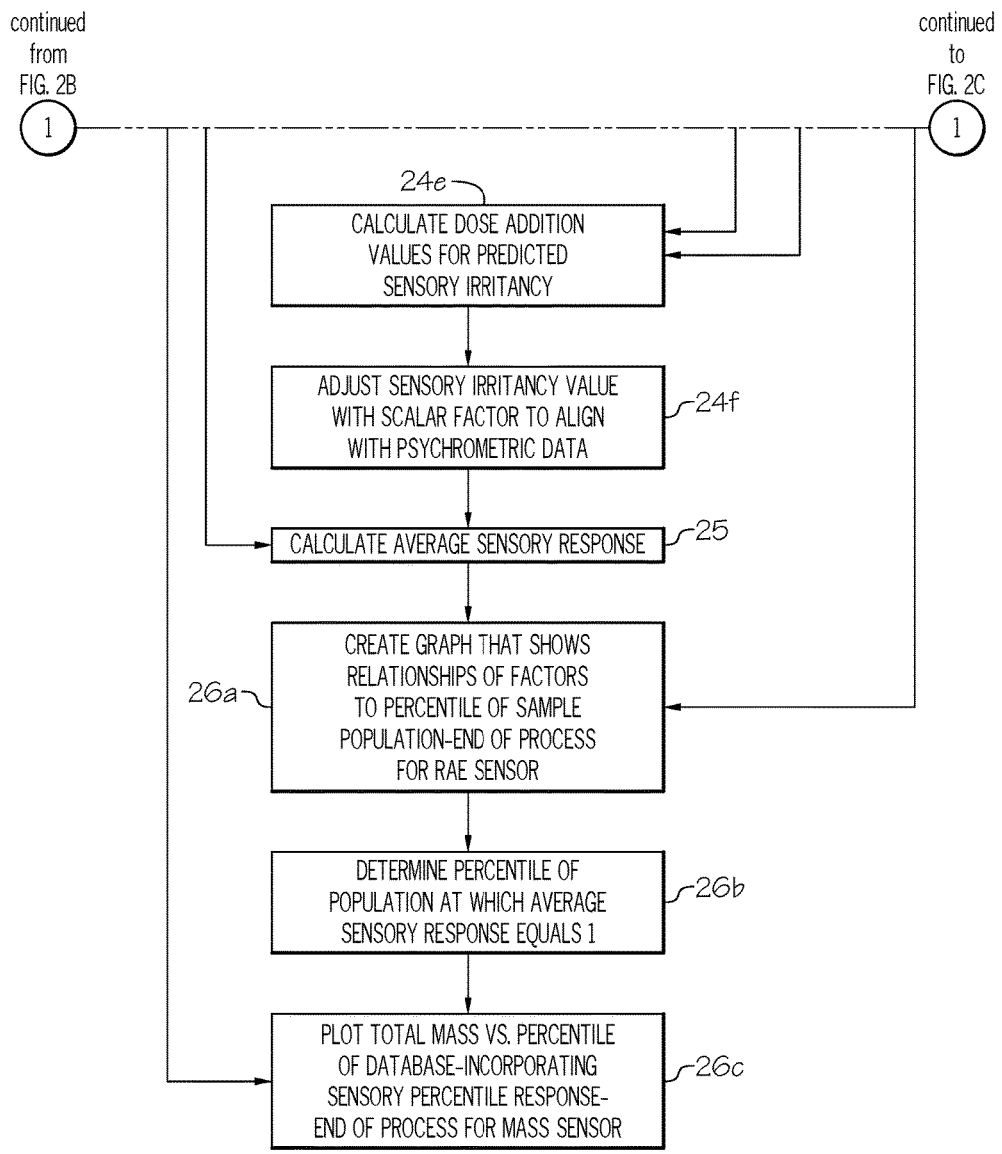

Step 21 may include steps 21a, 21b, and 21c shown in FIG. 2B and FIG. 2C. In step 21a, a total sample size for each contaminant may be determined (i.e., total number of samples tested for a contaminant of interest, regardless of whether the contaminant of interest was present). In step 21b, a non-zero sample size (i.e., number of samples where the contaminant of interest was present) for each contaminant may be determined. In step 21c, a frequency of occurrence for each contaminant can calculated by taking the ratio of non-zero samples to total samples. These results are shown in FIG. 3A and FIG. 3B.

In step 21d, as shown in FIG. 3A and FIG. 3B, the contaminants can be ordered by importance, starting from the highest frequency of occurrence and ending at the lowest frequency—for purposes of illustration. Other characteristics might be used to determine importance, such as sensory perception. One example is acrolein because it is extremely irritating at very low concentration.

FIG. 3A and FIG. 3B lists (for illustration purposes) sixty four of the most frequently occurring compounds in bleed air. It can be seen from FIG. 3A and FIG. 3B that only ten compounds occur in more than 60% of the samples. However, other contaminants, such as tricresylphosphate isomers (TCP), can be considered significant and included in the database, even if they do not occur frequently, due to concerns about the effects of long term exposure by humans.

As further described below, assessing the contaminants as shown in FIG. 3A and FIG. 3B can be used in the method 20 to interpret real-time air contaminant data from sensors, and provide an indication of when the levels may increase significantly enough to fall outside the range of normal distribution of the data. Identifying the level that falls outside levels normally encountered (i.e., thresholds) can be used to provide an early warning of a pending maintenance action in one instance. In another instance, identifying levels that fall outside a norm can be used for controlling outside air-flow and the air purification subsystem 13.

Referring to FIG. 2B and FIG. 2C and FIG. 4A and FIG. 4B, in step 22, for the contaminants of interest determined in step 21, individual contaminant concentrations can be calculated at various sample population percentiles in step 22a. In an exemplary embodiment, the individual concentrations for the individual contaminants in FIG. 3A and FIG. 3B were calculated at the mean of the database, and at the 75th, 90th, 95th, and 99th percentiles. Those contaminant concentrations—in both ug/m$^3$ and ppmV—are presented in FIG. 4A and FIG. 4B.

Referring to FIG. 2B and FIG. 4C and FIG. 4D, in step 22b, individual contaminant "concentration equivalents" can be calculated from the individual contaminant concentrations in step 22a. In an exemplary embodiment, the individual concentration equivalents for the individual contaminants in FIG. 3A and FIG. 3B were calculated at the mean of the database, and at the 75th, 90th, 95th, and 99th percentiles. Those contaminant concentration equivalents are presented in FIG. 4C and FIG. 4D.

The calculation of contaminant concentration equivalents can be performed in various ways, depending on the specific sensor(s) 12 used. In the illustrative experiments by the inventors herein, isobutylene PID sensors by RAE Systems were used. Therefore, sensors were calibrated to isobutylene, and the actual concentrations of the actual contaminants sensed were all converted to isobutylene equivalent concentrations (ppm-V), as shown in FIG. 4B. The conversion is obtained by the actual concentration divided by a correction factor for the contaminant as established by RAE Systems and replicated in the "Factor for denominator" column in FIG. 4C and FIG. 4D.

Referring to FIG. 2B and FIG. 2C and FIG. 5A and FIG. 5B, a step 23—for calculating a predicted odor detection threshold for one or more of the contaminants from step 21—can include steps 23a, 23b, 23c, and 23d in an exemplary embodiment.

Step 23a can include determining odor detection thresholds (ODTs) for one or more of the contaminants of interest from step 21. In one example, this can be accomplished experimentally.

In another example, step 23a can include looking up previously determined (i.e., published) ODTs for one or more of the contaminants of interest from step 21. For example, step 23a can include obtaining ODTs from Devos et al., (1990) Standardized human olfactory thresholds. Oxford: IRL Press, which is incorporated by reference herein in its entirety.

In step 23b, log 10 values of the reciprocals of the ODTs (for example, those from Devos 1990 above) can be calculated in volume, and in step 23c can be calculated in mass. The results are shown in FIG. 5A and FIG. 5B. The volume ODTs in units of ppm can be used to calculate predicted sensory thresholds or average sensory responses and then for eventual comparison with data of concentration equivalents in the contaminated air, as described below. Likewise, the mass ODTs in units of ug/m$^3$ can be used to calculate predicted sensory thresholds and then for eventual comparison with data of mass of contaminants in the contaminated air, as described below.

In step 23d, for one or more of the contaminants of interest, a predicted, single contaminant odor detection (OD) ratio (e.g., threshold) may be calculated wherein the numerator is the ppm contaminant concentration from FIG. 4A and FIG. 4B and the denominator is the ppm odor threshold from FIG. 5A and FIG. 5B. These ratios can be calculated at various sample population percentiles, which can be the same or different as the percentiles in FIG. 4A and FIG. 4B, as well as a mean. The results are shown in FIG. 5C and FIG. 5D. It can be noted that the contaminants for which ODTs and/or OD ratios are determined need not be identical to all of the contaminants in step 21.

In step 23e, the odor detection ratios from step 23d can be converted to dose addition ratios, as shown in FIG. 5A with the column headings "DA." The dose addition method is described in Fox, "Assessing Aircraft Supply Air to Recommend Compounds for Early Timely Warning of Contamination", Dissertation, April 2012 which is incorporated by reference herein in its entirety.

Also, in step 23e, predicted, mixed contaminant odor detection ratios (e.g., thresholds) can then be calculated. These ratios are the sum of the dose addition ratios of the individual contaminants according to the following:

$$\frac{C_1}{T_1} + \frac{C_2}{T_2} + \ldots + \frac{C_n}{T_n} = Q_{mix} \text{ Dose Addition Odor} \tag{1}$$

where C is the individual contaminant concentration in ppmV from FIG. 4A and FIG. 4B at a selected percentile and T is the odor detection threshold for that contaminant in ppmV for the dose addition (DA) from FIG. 5C and FIG. 5D at the same selected percentile.

The predicted, mixed contaminant dose addition ratios can be at various ratios, which can be at the same or different percentiles as in the individual dose addition ratios. These mixed ratios are shown at the bottom of FIG. 5C and FIG. 5D. As further described below, the mixed odor ratios are later used provide a predicted combined contaminant sensory threshold (i.e., average sensory response) for the mixture of contaminants of interest.

Without intending to limit the scope of the present invention, it is noted that the relationship between the concentrations of contaminants in a mixture to predicted odor is believed to be similar to the relationship of mixture contaminant concentration to the predicted sensory irritancy. This is described in Cometto-Muñiz, J. E., Cain, W. S., Abraham, M. H., & Gola, J. M. R. (1999). Chemosensory detectability of 1-butanol and 2-heptanone singly and in binary mixtures. *Physiology & Behaviour,* 67, 269-276. doi: 10.1016/S0031-9384(99)00074-8, which is incorporated herein by reference in its entirety. The predicted sensory irritancy of a mixture of contaminants has been found to have an additive effect on sensory irritancy, but not have a hypo-additive effect or a hyper-additive effect (Cometto-Muñiz et al., 1999). A strong correlation between dose additivity of a mixture on predicted odor detection levels half-way between chance and perfect detection has been reported at a probability level of 0.3 (0.00<P<0.35). Cometto-Muñiz, J. E., Cain, W. S., & Abraham, M. H. (2003). Dose-addition of individual odorants in the odor detection of binary mixtures. *Behavioural Brain Research,* 138, (1), 95-105. doi: 10.1016/S0166-4328(02)00234-6 which is incorporated herein by reference in its entirety. A strong correlation between dose additively at sensory irritancy detection levels half-way between chance and perfect detection has been reported at a probability level of 0.6 (0.55<P<0.65) by Cometto-Muñiz et al. (2003).

Therefore, like the calculation of odor detection thresholds for the contaminants of interest, the method 20 includes steps for calculating sensory irritancy thresholds for the contaminants of interest—through steps 24a, 24b, 24c, 24d, 24e and 24f according to an exemplary embodiment.

Step 24a can include determining sensory irritancy detection thresholds (SIDTs) for one or more of the contaminants of interest from step 21. For example, this can be accomplished experimentally. It can be noted that the contaminants for which SIDTs are determined need not be identical to all of the contaminants in step 21 and/or all of the contaminants in step 23.

In another example, step 24a can include looking up previously determined (i.e., published) SIDTs for at least one of the contaminants of interest from step 21 and/or step 23. For example, step 24a can include obtaining SIDTs from Abraham, M. H., Sanchez-Moreno, R., Gil-Lostes, J., Acree, W. E., Jr., Cometto-Muñiz, J. E., & Cain, W. S. (2010). The biological and toxicological activity of gases and vapors. *Toxicology in Vitro*, 24(2), 357-362. doi:10.1016/j.tiv.2009.11.009 which is incorporated herein by reference in its entirety.

In step 24b, log 10 values of the reciprocals of the SIDTs (for example, those from Abraham 2010 above) can be calculated in volume, and in step 24c can be converted from volume to mass. The results are shown in FIG. 6A. For example, the following equation can be used to calculate the conversion:

$$Y \text{ mg/m}^3 = (X \text{ ppm})(\text{molecular weight of contaminant})/24.45 \quad (2)$$

The volume SIDTs in units of ppm can be used to calculate predicted sensory thresholds or average sensory responses and then for eventual comparison with data of concentration equivalents in the contaminated air, as described below. Likewise, the mass SIDTs in units of ug/m³ can be used to calculate predicted sensory thresholds and then for eventual comparison with data of mass of contaminants in the contaminated air, as described below.

In step 24d, for one or more of the contaminants of interest, a predicted, single contaminant sensory irritancy detection (SID) ratio (e.g., threshold) may be calculated wherein the numerator is the ppm contaminant concentration from FIG. 4A and FIG. 4B and the denominator is the ppm odor threshold from FIG. 6A and FIG. 6B. These ratios can be calculated at various sample population percentiles, which can be the same or different as the percentiles in FIG. 4A and FIG. 4B, as well as a mean. It can be noted that the contaminants for which SIDTs and/or SID ratios are determined need not be identical to all of the contaminants in step 21.

In step 24e, one or more of the odor detection ratios from step 24d can be converted to dose addition ratios, as shown in FIG. 6C. These ratios can be calculated at various percentiles, which can be the same or different as the percentiles in FIG. 4A and FIG. 4B, as well as a mean. The results are shown in FIG. 6C.

Also, in step 24e, predicted, mixed contaminant, sensory irritancy detection ratios (e.g., thresholds) can then be calculated. These ratios are the sum of the dose addition ratios of the individual contaminants from step 24e according to the following:

$$\left(\frac{C_1}{T_1} + \frac{C_2}{T_2} + \ldots + \frac{C_n}{T_n}\right) \otimes 0.0005 = \quad (3)$$

$Q_{mix}$ Dose Addition Sensory Irritancy where C is the contaminant concentration in ppmV from FIG. 4A and FIG. 4B at a selected percentile and T is the sensory irritancy threshold for that contaminant in ppmV from FIG. 6A and FIG. 6B. The results are shown at the bottom of FIG. 6C.

In step 24f, the above dose addition equation (3) for sensory irritancy can include an adjustment based on qualitative experience. A factor of 0.0005 is utilized in this exemplary embodiment.

The method 20 continues to a step 25 wherein one or more predicted sensory thresholds, such as the predicted odor detection threshold from step 23 and/or the predicted sensory irritancy detection threshold from step 24, can but need not be combined to provide a predicted, combined contaminant sensory threshold or average sensory threshold (i.e., response) for the mixture of contaminants of interest. That average sensory threshold can be at various sample population percentiles, such as the same percentiles used in step 22 and/or step 23 and/or step 24.

The average sensory threshold can be calculated in step 25 by summing one-half of the mixed predicted odor ratio (from FIG. 5C and FIG. 5D) and one-half of the mixed irritancy ratio (from FIG. 6C), at the same percentile for each ratio. The results are shown in FIG. 7. As can be appreciated, the average sensory threshold or response can be based on thresholds other than odor and/or irritancy.

In step 26, there can be sub-steps 26a, 26b, and 26c according to an exemplary embodiment.

In step 26a, a comparison can be made between probability of contaminant detection versus contaminant percentile in database. The probability of contaminant detection can include one or more predicted sensory thresholds or ratios—for a single contaminant or a mixture of contaminants. For example, they can be one or more of the predicted mixed odor ratio, the predicted mixed irritancy ratio, and the average sensory response. A probability of one (1) can be considered equivalent to a 100% probability of detection by an occupant in an environment. The contaminant percentile may be the 75th, 90th, 95th, and 99th percentiles, as well as the mean, for example.

Step 26a may further include a comparison of contaminant concentration equivalents versus contaminant percentile in database. For example, as in the experiments described above, the concentration equivalents can be isobutylene equivalents.

The comparisons in step 26a can be depicted in tabular form, as in FIG. 7. They may also be shown graphically, as in FIG. 8.

Figure 8:
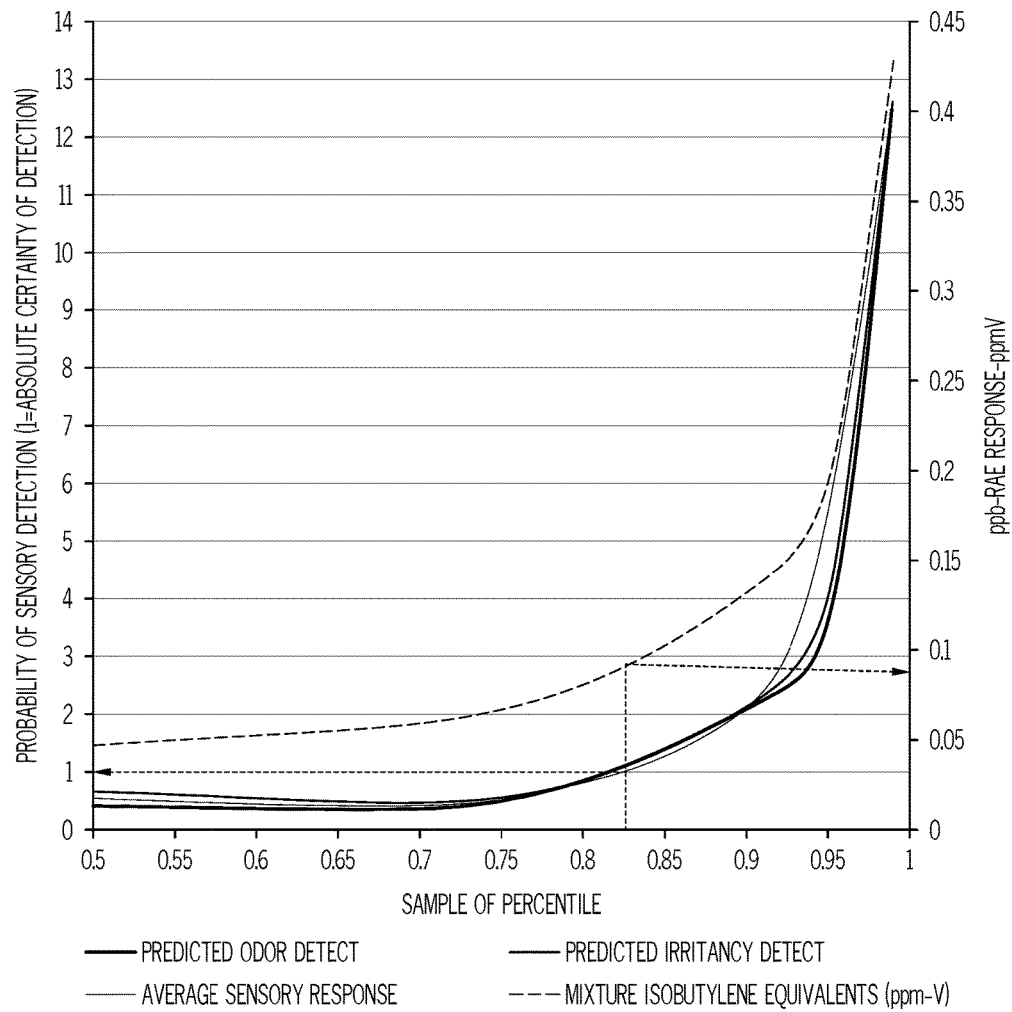
FIG. 8 is a graph of probability of detectability, percentile of sample database, and contaminant equivalence concentration.

In step 26b, and in reference to FIG. 8, a determination can be made of the sample population percentile at which one or more of the predicted mixed odor ratio, the predicted mixed irritancy ratio, the average sensory response, and the concentration equivalents has a probability of detection of one (1). This can also include the contaminant mass described below.

In step 26c, comparisons can be made as in step 26a, except that total contaminant mass can be compared instead of concentration equivalents. The comparisons in step 26c can be depicted in tabular form, as in FIG. 7. They may also be shown graphically, as in FIG. 9.

In step 27, adjustments to the outside air and/or recirculating air may be made based on the comparisons made in step 26. In some embodiments, the controller 11 can command adjustments to the air purification subsystem 13.

These adjustments may, in various embodiments be based on the sensed concentration equivalents reaching or exceeding a level that is below a 100% probability of contaminant detection—or, in other words, reaching or exceeding a predicted sensory response threshold.

For example, based on the comparisons depicted in FIG. 8—and in particular the mixed predicted odor ratio, the mixed predicted irritancy ratio, and average sensory response—adjustments may be made at about the 0.85 percentile or less. This is because the probability of detection is less than about 1.0 (or 100%) up to about the 0.80 percentile for the predicted sensory response threshold—e.g., the mixed predicted odor ratio, the mixed predicted irritancy ratio, and/or average sensory response. Thus, in the example of FIG. 8, the controller 11 may command adjustments to the air purification subsystem 13 when the controller receives a contamination signal that a predicted sensory threshold has been reached—e.g., an isobutylene concentration equivalent for the mixed contaminants has reached about the 0.80 percentile—about 0.009 ppm.

Figure 9:
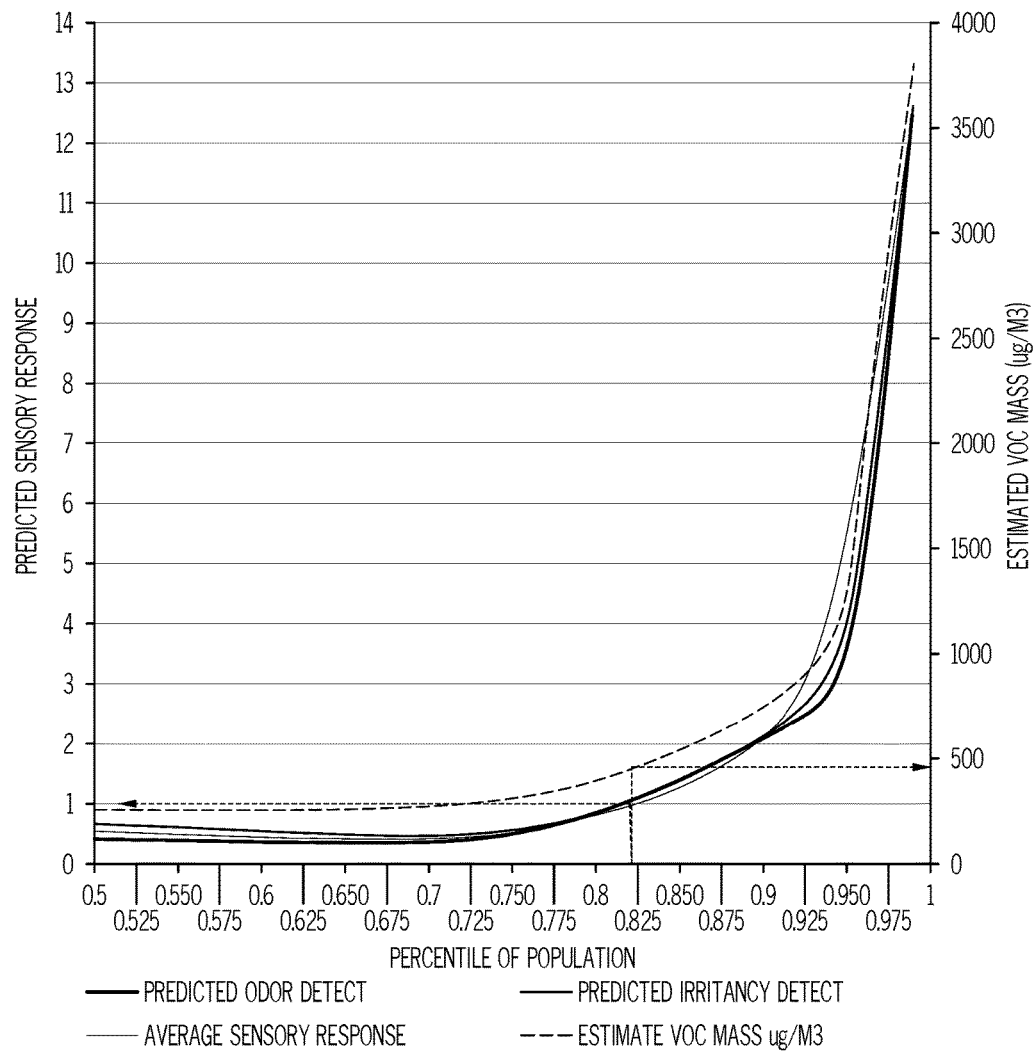
FIG. 9 is a graph of probability of detectability, percentile of sample database, and VOC mass.

In another example, based on the comparisons depicted in FIG. 9, adjustments may be made at about the 0.825 percentile or less than the 0.825 percentile. This is because the probability of detection is less than about 1.0 (or 100%) up to about the 0.825 percentile. In the example of FIG. 9, the controller 11 may command adjustments to the air purification subsystem 13 when the controller receives a contamination signal that total mass for the mixed contaminants has reached about the 0.825 percentile—about 450 $ug/m^3$.

It should be understood, of course, that the foregoing relates to exemplary embodiments of the invention and that modifications may be made without departing from the spirit and scope of the invention as set forth in the following claims.

We claim:

1. An environmental control system (ECS) having contaminants in air therein, comprising:
  a sensor;
  an air purification subsystem; and
  a controller in communication with the sensor and air purification subsystem;
  wherein the sensor:
    detects a contaminant in the air; and
    generates a contaminant signal;
  wherein the controller:
    compares the contaminant signal to a predicted sensory response threshold;
    wherein the predicted sensory response threshold is based on a plurality of contaminant sample population percentiles;
    wherein the predicted sensory response threshold is below a dose addition sensory response of 1.0; and
    when the contaminant signal reaches the predicted sensory response threshold, commands the air purification subsystem to alter a condition in the air containing the contaminant.

2. The ECS of claim 1, wherein the air containing contaminants includes outside air entering the ECS through engine and APU bleeds, or other air sources including ground supplies and electric compressors, and recirculated air circulating through the ECS.

3. The ECS of claim 1, wherein the contaminant signal is based on one of odor, irritancy, mass, and a combination thereof.

4. The ECS of claim 1, wherein the contaminant signal is based on a sample of anticipated contaminants in the air.

5. The ECS of claim 1, wherein the predicted sensory response threshold is based on a percentile population of anticipated contaminants in the air.

6. The ECS of claim 1, wherein the predicted sensory response threshold is based on one of an odor threshold, an irritancy threshold, a mass threshold, and a combination thereof.

7. The ECS of claim 1, further comprising a valve, a mix manifold, and a fan in communication with the controller.

8. The ECS of claim 1, wherein sensor senses one of outside air entering the ECS, recirculated air circulating through the ECS, and a combination thereof.

* * * * *